United States Patent [19]

Wray

[11] Patent Number: 4,787,942
[45] Date of Patent: Nov. 29, 1988

[54] METHOD FOR PREPARING REACTIVE METAL SURFACE

[76] Inventor: Daniel X. Wray, 6585 Corte Cisco Ct., Carlsbad, Calif. 92008

[21] Appl. No.: 6,806

[22] Filed: Jan. 27, 1987

[51] Int. Cl.$^4$ .............................................. C23C 22/24
[52] U.S. Cl. .................................. 148/6.15; 427/327
[58] Field of Search ..................... 427/327; 148/6.15; 134/2, 26

[56] References Cited

U.S. PATENT DOCUMENTS

| | | | |
|---|---|---|---|
| 2,992,131 | 7/1961 | Bricknell et al. | 427/327 |
| 3,651,604 | 3/1972 | Queyrel et al. | |
| 4,118,253 | 10/1978 | Rowe et al. | 148/6.15 RV |
| 4,225,349 | 9/1980 | Koshiyama et al. | |
| 4,268,556 | 5/1981 | Pedrotty | 428/64 |
| 4,352,841 | 10/1982 | Bowditch | 427/327 |
| 4,430,387 | 2/1984 | Nakagawa | |
| 4,517,248 | 5/1985 | Leendert et al. | 427/327 |
| 4,590,100 | 5/1986 | Hearst | 427/327 |

FOREIGN PATENT DOCUMENTS

| | | |
|---|---|---|
| 2384483 | 3/1978 | France |
| 2486392 | 7/1980 | France |

OTHER PUBLICATIONS

Chemical Abstracts 95: 86264k, "Anesthetic Effect of Local Anesthetics Grafted Onto Poly(Vinyl Alcohol-)-Based Polymer Fibers", by Khatskevich et al, Stomatologiya (Moscow), 60, 12–14 (1981).
Chemical Abstracts 97: 11881s, "Dental Fillings Containing Synthetic Fibers", by Showa Pharmaceutical Company, Ltd., Jpn. Tokkyo Koho JP 82 02682 (Cl. A61K6/06), 18 Jan. 1982.
Chemical Abstracts 84: 95585r, "Oxytetracycline Formulation to be Applied at the Oral Mucosa", by J. Korbar–Smid et al, Acta Pharm. Jugosl., 25, 271–6 (1975).
R. P. Langer and N. Peppas, "Chemical and Physical Structure of Polymers as Carriers for Controlled Release of Bioactive Agents: A Review", Rev. Macromol. Chem. Phys., 23, 61–126 (1983).

*Primary Examiner*—Thurman K. Page
*Assistant Examiner*—L. R. Horne
*Attorney, Agent, or Firm*—John E. Vanderburgh

[57] ABSTRACT

A method for the preparation of reactive metal surfaces whereby the finished surfaces are in a reactive, essentially reduced condition and controlled oxidation reactions are employed to chemically bond a film on the metal surface to protect the surface or to provide a selected surface characteristic. During preparation the surface is covered by a working fluid that is inert with respect to the metal being worked and which is a solvent for film forming molecules which are being applied to the surface. The film forming molecules are thus readily chemically bonded to the reactive metal under controlled conditions essentially simultaneously with surface preparation to form a chemically uniform film on the reactive metal surface. The film is thus formed in the absence substances which may also react with the substrate metal to form undesirable reaction by-products which interfere with creation of a uniform, chemically bonded film on the substrate and which can result in pitting of the metal surface. The working fluid comprises a solvent for film forming monomers which is inert with respect to the metal being finished and may include halogenated liquid hydrocarbons and water as the solvent. Among the materials used to form the films of the method of the present invention good results have been achieved with hydroxyl and carboxyl terminated perfluoroalkylpolyethers. In addition inorganic film forming molecules such as phosphates, sulfates or chromates are used where water is the solvent for the working fluid. Articles produced by the method of the invention are claimed.

10 Claims, No Drawings

METHOD FOR PREPARING REACTIVE METAL SURFACE

Field of the Invention

This invention relates to reactive metal surfaces and more particularly to a method for preparing a reactive metal surface to provide a chemically uniform finished surface thereon and to articles manufactured thereby.

CROSS REFERENCE TO RELATED APPLICATIONS

Applicant has discovered certain uniquely advantageous surface treatment formulations which are especially suited for use with the method herein described and the articles manufactured thereby, and reference is to my copending applications Ser. No. 007,278, entitled METAL SURFACE COATING, and Ser. No. 007,277, entitled IMPROVED RECORDING MEDIUM AND PROCESS FOR MANUFACTURING THE SAME, both filed of even date herewith and the disclosures thereof being incorporated herein by reference.

BACKGROUND OF THE INVENTION

Metals normally are quite reactive and readily oxidized under the proper conditions. Thus for example, iron readily reacts with oxygen to form the various oxides of iron in the presence of hydrogen ion, normally as provided by water. Other metals such as alminum, cobalt, chromium and nickel are also highly reactive and the surfaces of these metals are normally covered with an oxide coating. Although these metals are normally considered as corrosion resistant as compared, for example, to iron, it is in fact their high reactivity that provides this property as the oxides of these metals are relatively inert and thus create a protective coating over the metal which gives the metal its corrosion resistance.

The oxide coatings, however, can be a serious problem if it is desired to modify or enhance the surface of the metal by providing a coating thereover. For example, if a decorative coating is applied to the metal surface over the substantially nonreactive oxide coating, the coating may not adhere properly and in fact can make metal corrosion worse than if the surface were uncoated. In other applications it may be desired to apply lubricant coatings over a metal surface, as is the case in magnetic recording media such as discs and recording tape. Such articles normally employ a cobalt or nickel metal surface for the magnetic imprinting of data and the like. These surfaces are then brought in close proximity or contact with a slider head for imprinting or playing back the magnetic information. The relative proximate contact between the slider head and the magnetic surface can produce severe wear on the surfaces of both the slider head and the magnetic recording media. Various lubricating compositions have been employed in the prior art as coatings over the surface of the recording media to reduce wear. If these coatings are applied without some chemical bonding between the coating material and the surface of the recording media, the lubricant film is quickly worn away and the lubricity lost.

Yet another problem is encountered in connection with the uniformity of the surface of the metal product after manufacturing. For example, it is highly desirable to provide as uniform a surface as possible for recording media. The substrate of such recording media, particularly for recording discs, is often aluminum over which is deposited nickel and cobalt coatings. The substrate material is normally first machined to remove surface imperfections and then subjected to the subsequent operations to provide the magnetic coatings thereon. It has been found, however, that when machining metal substrates such as aluminum in the presence of cutting fluids, there are reactions occurring between the cutting fluids and the reactive aluminum surface to produce reaction byproducts which adhere to the metal surface. These reaction byproducts interfere with subsequent coating or surface preparations and are ordinarily sloughed off during the subsequent operations to produce pin holes or imperfections in the overcoating layers or produce pitting of the substrate surface which seriously interferes with the creation of a highly uniform finished surface for the recording medium.

SUMMARY OF THE INVENTION

In accordance with the present invention a method is provided for the preparation of reactive metal surfaces whereby the finished surfaces are in a reactive, essentially reduced condition and controlled oxidation reactions are employed to chemically bond a film on the metal surface to protect the surface or to provide a selected surface characteristic. Moreover, by the method disclosed herein reactions between the reactive metal surface and cooling fluids, cutting oils and the like which may occur during finishing of the surface are substantially avoided. Pitting of the surface due to such reaction byproducts is essentially eliminated thereby improving the uniformity of the finished surface and there is provided on the surface of the metal a film which is chemically uniform.

The surface of the metal is prepared by any of the usual procedures such as, for example, by grinding, polishing or milling. Thus, except as described hereinafter, the techniques conventionally employed in surface finishing operations are those that are employed for the finishing of the surface of the particular metal or metal alloy being worked in accordance with the invention.

Thus, in accordance with the invention the reactive metal surface condition is achieved by removing the existing oxide coating from the metal surface by machining under conditions which insure that the formation of an oxide on the metal surface is maintained at a minimum until the surface film is formed. Accordingly, during preparation the surface is covered by a working fluid that is inert with respect to the metal being worked and which is a solvent for film forming molecules which are being applied to the surface. The film forming molecules are thus readily chemically bonded to the reactive metal under controlled conditions essentially simultaneously with surface preparation to form a chemically uniform film on the reactive metal surface. The film is thus formed in the absence substances which may also react with the substrate metal to form undesirable reaction byproducts which interfere with creation of a uniform, chemically bonded film on the substrate and which can result in pitting of the metal surface.

As stated, the working fluid comprises a solvent for film forming monomers which is inert with respect to the metal being finished. By inert it is meant that the fluid inhibits or prevents the formation of undesirable films or other reaction byproducts on the surface of the metal being finished. At the same time the film forming molecules are free to react with the reactive metal surface as it is prepared to form a chemically uniform film thereover. It is preferred that the fluid be inert over a relatively wide temperature range, normally up to the boiling point of the fluid.

Among the materials which are highly preferred for use as the solvent for the working fluid are liquid halogenated hydrocarbon compositions. These compositions are stable over a wide range of temperatures and are inert with respect to metal substrates over a wide temperature range. Such materials include fluorinated chlorinated liquid alkanes such as trichlorotrifluoroethane (Freon TF) and 1,1,1-trichlorethane. In addition to the characteristics stated above, these materials are also relatively non-toxic and easy to work with.

Among the materials used to form the films of the method of the present invention good results have been achieved with hydroxyl and carboxyl terminated perfluoroalkyl-polyethers having the formula $$CF_3-(CF_2O)_m-(C_2F_4O)_n-CF_2-COOH \quad (a)$$

where m and n are each integers of between about 0 and about 10. Perfluoroalkanoic acids of the general formula $$CF_3-(CF_2)_n-COOH \quad (b)$$

where n is an integer of between about 4 and about 12 are also used with good results.

The perfluoroalkylpolyether and perfluoroalkanoic backbones of (a) and (b) above may also be terminated with phosphate and sulfonate groups as represented by the following formulas $$F-(A)-SO_3H \quad (c)$$

and $$F-(A)-O-PO_3H \quad (d)$$

where A is a perfluro backbone as set forth in (a) or (b) above. The molecules as represented by formulas (a)-d) above are further modified by substituting chlorine, iodine, hydrogen or other functionalities, such as methyl for the fluorine atom in the molecule. Also, the alkane backbone of the molecules represented in formula (b) may be ethylenically unsaturated such as with polyvinyl or other alkenes.

In addition to the liquid hydrocarbons, we have found, unexpectedly, that water which is free of hardness ions, such as for example distilled or demineralized water, can be utilized as a working fluid in the mechanical finishing of metal surfaces. The water functions as the inert solvent to prevent the formation of undesirable reaction byproducts on the metal surface. The water also serves as the solvent for the film forming molecules. For example, highly uniform oxide films are formed on the surface of the metal being finished. Using water as the solvent, films comprising molecules terminated by polar groups such as phosphates, sulfates or chromates are formed on metal surfaces. In such cases the film forming molecule must be present in the aqueous solution in sufficient concentration to favor bonding of the film forming molecule over bonding of the dissolved oxygen in the water. Although it is not essential, it is preferred to buffer the demineralized water to pH of between about 5.5 and about 8. However, the pH range is a matter of choice depending upon the metal and the desired surface coating and is selected according to parameters well understood by those skilled in the art.

By maintaining contact between such water and the surface of the metal article during finishing operations, the tendency of the reactive metal surface to form oxides or other undesirable reaction byproducts such as occur with the use of organic cutting fluids, is substantially reduced and the finished surface is maintained in the reactive condition while the film forming molecules are bonding to the metal surface.

In the preferred method of operation the water cutting fluid is maintained at a reduced temperature, i.e. between about 4° C. and about 15° C. The milling operation may be carried out with the article submerged in chilled water cutting fluid bath or in the alternative the cutting fluid can be caused to flow across the surface of the article being machined such as by spraying a stream of cutting fluid water during the machining operation.

In carrying out the method of this invention, I employ any reactive metal substrate on the surface of which the presence of undesirable reaction byproducts is to be avoided and on which it is desired to provide uniform adherent coatings.

As previously mentioned, the use of organic cutting fluids leads to the development of unstable oxidative byproducts on the surface of the reactive metal substrate. Such cutting fluids, for example kerosene, ethanol, isopropyl alcohol, light oils and the like have been utilized both for their ability to cool the article being worked and to provide some degree of lubrication. Surprisingly, essentially the same results are achieved using chilled demineralized water while at the same time the formation of undesirable reaction byproducts is avoided.

The chilled water cutting fluid may also include a slurry of inert abrasive material such as, for example, when it is desired to carry out a polishing operation on the surface of the metal substrate. Thus, nonreactive abrasives such as alumina, diamond or silica may be incorporated in the chilled water to provide an abrasive polishing cutting fluid system.

DETAILED DESCRIPTION OF THE INVENTION

The invention will be further described in connection with the following example showing certain preferred embodiments thereof. The example is by way of illustration only and not of limitation. It should be understood that many variations of the invention are possible without departing from the spirit or scope thereof.

EXAMPLE 1

The surface of an aluminum disc is polished to a mirror finish to remove oxide coatings therefrom. The polishing slurry is finally divided alumina, approximately one micron particle size, in distilled water buffered with 0.01 wt % boric acid and sodium borate. The slurry was maintained at a temperature of 25° C. during the polishing operation. Upon completion of the polishing the disc is washed with chilled distilled water and dried. The disc is then immersed in a zincating bath (zinc hydroxide, sodium hydroxide mixture sold by Witco Chemical under the trade name ARP 302) for 30 seconds. Following this the disc is dipped in concentrated nitric acid for 30 seconds followed by a second cycle in the zincating bath. This removes the oxide film and replaces it with a zinc aluminum amalgam. As a test for the uniformity of the original oxide coating surface tracing data was obtained before and after the zincating cycles. Comparison of the surface tracings showed essentially no difference before and after the zincating cycles indicating that the oxide film formed during finishing was highly uniform.

EXAMPLE 2

Aluminum discs are polished to remove the oxide coating from the surface of the discs and to prepare a reactive aluminum surface. During polishing the disc surface is continuously flooded with a working fluid consisting of Freon TF in which is dissolved 250 ppm of hydroxy terminated perfluoropolyether (Fomblin Z Dol, sold by Montedison). Immediately following the polishing operation, the discs are dried at about 150° C. and subjected to the zincating cycles of Example 1. The disc surfaces exhibited no chemical reactivity.

EXAMPLE 3

Nickel discs were polished using the working fluid of Example 2. Examination of the finished disc surfaces using ECSA electron microscopy technique demonstrated that the film molecules were bonded to the nickel surface of the discs and that the film molecules were oriented essentially normal to the disc surface.

Having described the invention, I claim:

1. A method for the preparation of a reactive metal surface to provide a chemically uniform film bonded thereon, said method comprising the steps of:
   a. treating said metal surface to remove existing oxidative coatings formed therefrom and to expose the reactive metal underlying the oxidative coatings,
   b. essentially simultaneously contacting said reactive metal with a working fluid containing film forming molecules selected from the group of molecules having the formula $[CX_3-(CX_2O)_m-(C_2X_4O)_n-CX_2]$ and $[CX_3-(CX_2)_n]-$ wherein X comprises fluorine, chlorine, iodine hydrogen or methyl, m and n are integers of between 0 and about 12, and where X is hydrogen the hydrocarbon groups may be ethylenically unsaturated, said film forming molecules having a terminal group selected from the phosphate, sulfate, chromate, sulfonate, hydroxyl, carboxyl and oxide groups, said working fluid comprising a solvent for said film forming molecules and being inert with respect to said reactive metal surface thereby to cause said molecules to bond directly to said metal surface while said surface is maintained in a reactive, essentially reduced condition and to form thereon a uniform film.

2. The method of claim 1 wherein said solvent is a liquid halogenated hydrocarbon.

3. The method of claim 2 wherein said solvent is 1,1,1-trichlorethane.

4. The method of claim 2 wherein said solvent is trichlorotrifluoroethane.

5. The method of claim 1 wherein said solvent is demineralized water.

6. The method of claim 5 wherein said demineralized water is buffered to a pH of between about 5.5 to about 8.

7. The method of claim 1 wherein the metal surface is aluminum and said working fluid is trichlorotrifluoroethane in which is dissolved 250 ppm of hydroxy terminated perfluoropolyether.

8. The method of claim 1 wherein the metal surface is aluminum and said working fluid is buffered demineralized water.

9. The method of claim 7 wherein the metal surface is nickel.

10. A reactive metal substrate produced in accordance with the method of claim 1.

* * * * *